United States Patent
Rixen et al.

(10) Patent No.: US 6,553,738 B1
(45) Date of Patent: Apr. 29, 2003

(54) HOLLOW PROFILE BAR

(76) Inventors: Wolfgang Rixen, Friedenstrasse 107-109, D-42699 Solingen (DE); Gerrit Pies, Friedenstrasse 107-109, D-42699 Solingen (DE)

(*) Notice: Subject to any disclaimer, the term of this patent is extended or adjusted under 35 U.S.C. 154(b) by 0 days.

(21) Appl. No.: 09/857,515
(22) PCT Filed: Dec. 6, 1999
(86) PCT No.: PCT/EP99/09511
§ 371 (c)(1),
(2), (4) Date: Jun. 1, 2001
(87) PCT Pub. No.: WO00/34597
PCT Pub. Date: Jun. 15, 2000

(30) Foreign Application Priority Data

Dec. 4, 1998 (DE) .................... 198 55 928

(51) Int. Cl.$^7$ ................................ E04C 3/30
(52) U.S. Cl. ............... 52/731.2; 52/731.4; 52/731.5
(58) Field of Search ............... 52/731.2, 731.4, 52/731.5

(56) References Cited

U.S. PATENT DOCUMENTS

| | | | | |
|---|---|---|---|---|
| 3,875,721 A | | 4/1975 | Mengeringhausen | ......... 52/731 |
| 4,301,994 A | * | 11/1981 | Lindsey | ............. 254/134.3 |
| 4,583,359 A | | 4/1986 | Staeger | ............. 52/721 |
| 5,842,299 A | * | 12/1998 | Switzer et al. | ............. 42/89 |
| 5,979,119 A | * | 11/1999 | Trafton | ............. 52/40 |
| 6,397,537 B2 | * | 3/2001 | Auer et al. | ............. 52/282.2 |

FOREIGN PATENT DOCUMENTS

GB 2064055 6/1981

* cited by examiner

Primary Examiner—Carl D. Friedman
Assistant Examiner—Nahid Amiri
(74) Attorney, Agent, or Firm—Pandiscio & Pandiscio

(57) ABSTRACT

A hollow profile bar, preferably of extruded metal, comprises a tubular wall that is equally thick all around and is provided with salient outer webs evenly distributed about the outer circumference, which in pairs form undercut casing grooves with side walls, a radial salience of the outer webs from the tubular wall being substantially equal to the thickness of the tubular wall. To achieve tight packing of profile bars that are to be connected in one sectional plane of a hollow profile bar, the hollow profile bar is configured in such a way that slope lines of the side walls of an outer web intersect between the outer web and the axis of the bar.

9 Claims, 3 Drawing Sheets

HOLLOW PROFILE BAR

BACKGROUND OF THE INVENTION

1. Field of the Invention

The invention relates to a hollow profile bar, especially of extruded metal, comprising a tubular wall that is equally thick all around and is provided with salient outer webs, evenly distributed about the outer circumference, which in pairs form undercut casing grooves with side walls, a radial salience of the outer webs from the tubular wall being practically equal to the thickness of said tubular wall.

2. Description of the Prior Art

A hollow profile bar having the aforesaid features is known from DE U 296 15 208. The outer webs are broader at their outer circumference than at their circumference defined by the bottom of the casing grooves, thus forming a corresponding undercut. The degree of undercutting is determined, i.e., rendered minimal, by the fact that the slope lines intersect approximately within the axis of the tube. To make it possible to connect other hollow profile bars, links are used that can subsequently be "docked" at any point on the undercut outer webs. Because of the minimal undercutting of the outer webs, such links extend over a substantial circumference of the hollow profile bar and comprise in particular four coupling saliences, each of which engages in a respective casing groove. One result of this arrangement is uneven loading of the coupling saliences and thus the link; moreover, no more than four links can be used, thereby limiting the number of structures that can be connected to a hollow profile bar in one plane.

It is further known, for example from GB A 1 557 693, to realize sharply undercut outer webs on hollow profile bars having a tubular wall that is equally thick all around. The outer webs are T-shaped or have an anchor-shaped cross section. They form a polygonal outer circumference of the hollow profile bar. Its casing grooves are of large volume, resulting in substantial instabilities when elements are anchored to the outer webs to effect the force- or form-fitting connection of an additional hollow profile bar by means of a link.

Known from U.S. Pat. No. 3,969,031 are hollow profile bars comprising sharply undercut casing grooves of small volume. The outer webs forming the casing grooves in this case are only slightly salient, but are very wide in comparison to the casing grooves. A tubular wall that is equally thick all around is present in this case as well. However, the known tubular wall forms the bottoms of the grooves, portions of their side walls and regions of the outer web. The inner circumference of the hollow profile bar is therefore corrugated, and this corrugation causes the known tubular wall to exhibit instabilities when subjected to relatively high loads by hollow profile bars that are to be clamped thereon.

SUMMARY OF THE INVENTION

The object of the invention is, therefore, to improve a hollow profile bar having the features recited in the introduction hereto in such fashion that, despite possessing a tubular wall that is equally thick all around and thus is advantageously thin, it permits the stable clamped attachment of one hollow profile bar or additional hollow profile bars, particularly when plural hollow profile bars are to be coupled thereto within the same coupling plane.

This object is achieved by the fact that slope lines of the side walls of an outer web intersect between said outer web and the axis of the bar.

It is of significance for the invention that the slope lines of the side walls of an outer web, specifically of the same outer web, intersect between said outer web and the axis of the bar. The side walls thus are much more sharply inclined, and the undercuts correspondingly greater, than when the slope lines pass through the axis of the bar or embrace it without a prior point of intersection. In no case are the slope lines perpendicular to the outer circumference of the tubular wall, but instead form an acute angle therewith. The acute angularity makes it possible for a link of a to-be-coupled hollow profile bar to engage one of the two side walls of an outer web in a radially form-fitting manner. It is of importance in this regard that the coupling sites furnished by the outer webs are close to the tubular wall, thus eliminating the possibility of any especially high lever arms on the outer webs that might lead to deformation of the outer webs and/or the tubular wall. Due to the considerable slope of the side walls of the outer webs, links coupling profile bars are able to engage only a few outer webs, or in the extreme case, only one. The links therefore take up only a small portion of the outer circumference of the tubular wall.

The hollow profile bar can be improved in such a way that the slope lines of the side walls of an outer web have a point of intersection within the tubular wall. Such an embodiment is especially advantageous when the width of the outer webs at the outer circumference of the tubular wall is approximately equal to the thickness of said wall. The resulting structure in the area of interconnection between the outer web and the tubular wall is economical of material but still sufficiently strong.

To reduce notch stresses caused by loading of the outer web in the aforesaid area of interconnection between the outer web and the tubular wall and to avoid compromising the handling of the hollow profile bar by undesirable sharp edges during coupling and during the use of the finished structure, the hollow profile bar is configured so that the side walls of an outer web transition at predetermined radii to the outer circumference of the tubular wall and/or to a visible surface of the outer web that is practically parallel to the outer wall or is arched convexly with respect thereto.

It can further be advantageous if the smallest spacing between two outer webs is practically equal to or is greater than the outer circumferential length of one of said outer webs. This results in large widths for the grooves, especially in the area of the opening thereof. It is therefore possible to use links that are of comparatively broad construction in the circumferential direction of the tube. The links can be implemented with correspondingly sturdy cross sections.

If the hollow profile bar needs to be especially sturdy in the region where it is to be engaged by links for other hollow profile bars; it can be advantageous to configure the hollow profile bar in such a way that the outer circumferential length of an outer web is practically three times the smallest spacing between two outer webs. The tubular wall then has an especially massive and correspondingly sturdy cross section between two casing grooves. Such a cross-sectional configuration of the hollow profile bar can be integrated equally successfully into an otherwise differently realized cross-sectional configuration.

The hollow profile bar is advantageously configured so that the pitch of the outer webs on tubular walls having a circularly cylindrical cross section is 22.5 or 45 angular degrees. Given that the cross sections of hollow profile bars are normally dimensioned in the range of a few centimeters, this yields an outer circumferential shape that makes it possible to work with links for to-be-connected hollow profile bars that have normal cross sections with respect to strength requirements.

A significant improvement of a hollow profile bar can be considered to reside in providing an inner wall of a tubular wall having an equal thickness all around with more than two radially salient inner webs evenly distributed about the inner circumference of said inner wall. Such inner webs can assume multiple functions. One such function is to stabilize the hollow profile bar against bowing under load. In addition, it is possible to apply links to them that engage in an end of the hollow profile bar and are able to clamp onto the inner webs. In such cases, the inner webs must protrude only as far as is necessary for them to be gripped securely by the links. They do not need to span the entire interior space of the tube, creating uninterrupted transverse walls.

In a particular manner, the hollow profile bar can be realized so that the inner webs are aligned with the undercut casing grooves. In this case, the inner webs stiffen the inner webs of the tubular wall in a region between the two outer webs, particularly against inward collapse of the inner wall. This is especially advantageous when the links are applied across two outer webs that include a casing groove between them, thus subjecting the region of the tubular wall between the outer webs to particularly high stress.

The hollow profile bar can be configured so that the pitch of the inner webs is the same as or twice that of the casing grooves. If the pitch of the inner webs is the same as that of the casing grooves, the result is ideal stiffening of the tubular wall over its entire circumference, especially if inner webs are aligned with the undercut casing grooves. Doubling the pitch of the inner webs is indicated when hollow profile bars of comparatively small cross section are to be used with the most massive possible links to clamp inner webs inside the hollow profile bar.

It is possible to configure the hollow profile bar so that each inner web comprises a broad base and a thinner clamping strip extending radially therefrom. The broad base and the thinner clamping strip placed thereon form a shoulder. The broad base is sturdier than the clamping strip, thus enabling it to safely transfer any fastening forces or other external forces exerted on the clamping strip by the structure. Broad-based inner webs are especially advantageous when they stiffen the tubular wall in the area between two outer webs.

BRIEF DESCRIPTION OF THE DRAWINGS

The invention is described with reference to exemplary embodiments depicted in the drawing, wherein:

FIG. 3a is a depiction similar to that of FIG. 1, with two profile bars to be coupled on, and FIG. 3b a rear elevation of the link, shown in direction A of FIG. 3a.

DESCRIPTION OF THE PREFERRED EMBODIMENTS

Figure 1:
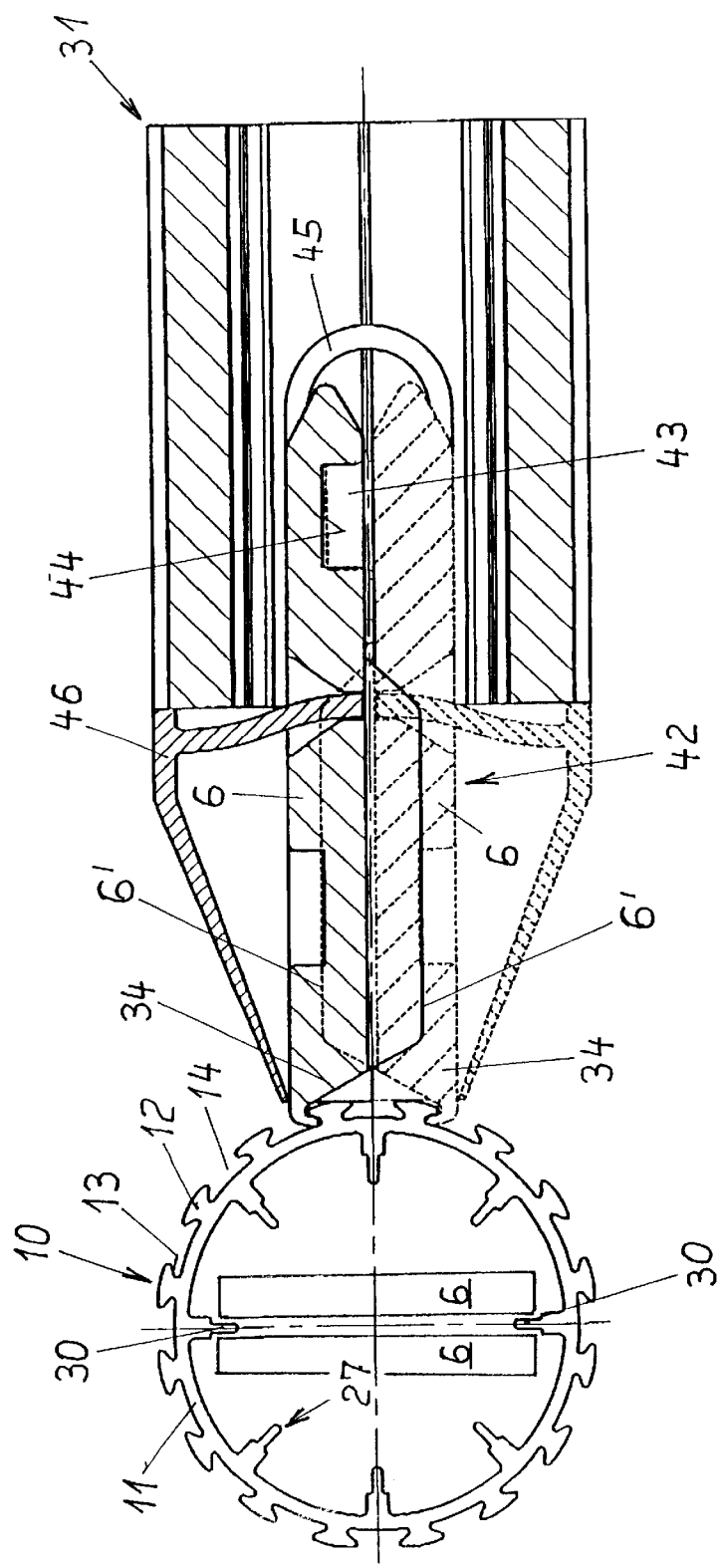
FIG. 1 is an end elevation of a first profile bar to which is coupled a second profile bar, shown in cross section, by means of a link, also shown in cross section.

The figures provide cross sections and end elevations of hollow profile bars 10 to which hollow profile bars 31 of identical or different configuration are to be connected. This purpose is served by links 42 that can be of any desired design.

The first hollow profile bar 10 is realized as substantially circularly cylindrical. It is, therefore, a tube comprising a tubular wall 11, whose thickness 16 is adapted to the loads expected to be exerted thereon. The hollow profile bar 10 is stiffened by outer webs 12, evenly distributed about the outer circumference, that are salient radially and form casing grooves 14 between them. The salience 15 of the outer webs 12 from the tubular wall 11 is practically equal to the thickness 16 of tubular wall 11. The visible surface 22 of outer webs 12 is arched convexly relative to tubular wall 11, but could be arched to a greater or lesser extent, for example extending parallel to tubular wall 11. Outer webs 12 are evenly distributed about the outer circumference of profile bar 10, specifically at a pitch 25. Two outer webs 12 include between them a casing groove 14, realized in a swallowtail shape. The specific shape depends on the configuration of the side walls 13 and the outer webs 12. The side walls 13 are predominantly straight, and a slope line can therefore be assigned to each of them. Side walls 13 in FIG. 2 have the slope lines 17, 17', which intersect. The point of intersection 19 is shown in the area of tubular wall 11 in FIG. 2. If the side walls 13 had a lower slope, it could also be located inside the tubular wall 11, i.e., between the inner wall 26 thereof and an axis 18 of the bar. In any case, each side wall 13 forms an undercut 32, so that the width of an outer web 12 at the outer circumference 21 of the tubular wall 11 is smaller than the outer circumferential length 24 of the outer web. This is also true of outer webs 12', whose outer length 24' is much greater, since outer webs 12' are arranged at a pitch 28 that is twice the pitch 25 of outer webs 12. Outer webs 12' can be arranged about the entire circumference of the tubular wall at pitch 28 without thereby altering the coupling feasibilities, since the link 42 always grips over the same width, i.e., either over two outer webs 12 or over one outer web 12'. Outer webs 12' increase the consumption of material for hollow profile bar 10, which is not necessary for normal, relatively low stresses.

Accordingly, the outer circumferential length 24' of an outer web 12' is practically three times the smallest spacing 23 between two outer webs 12. It is generally true of outer webs 12 that their smallest spacing 23 is practically equal to the outer circumferential length 24 of said outer webs 12. This yields a casing groove 14 that is sufficiently capacious for the engagement of tong legs 34 of link 42.

It should further be pointed out that the side walls 13 of an outer web 12 transition at a predetermined radius 20 to the outer circumference 21 of tubular wall 11. This prevents notch stresses in the transition region, which can arise due to loads exerted on the outer webs 12. The radius results in a corresponding shortening of the straight extension of a side wall 13, which is especially noticeable in the case of planar outer webs.

Radii 20' are further present at the transition from the side walls 13 to a visible surface 22 that is practically parallel to the outer wall or is arched convexly with respect thereto. As is apparent from FIG. 2, in particular, the aforesaid radii facilitate the engagement of tong legs 34 by tong ends 34', especially when it is necessary to compensate for tilts caused either by tilting of the link 42 or by tolerances with respect to the link 42 or the stresses imposed on it.

The inner wall 26 of tubular wall 11 is occupied by inner webs 27 that are evenly distributed about the inner circumference of tubular wall 11. Each inner web has a broad base 29, which at one end is seated directly on the inner wall 26 and is radially salient therefrom, i.e., is oriented toward the axis 18 of the bar. At its other end, each broad base is provided with a clamping strip 30 that can be gripped by clamping jaws 6 of link 42. It is not absolutely necessary for every clamping strip 30 to be provided with a broad base 29. This depends, rather, on the width of the clamping jaws 6 used in the link 42. If a hollow profile bar 10 is square, for example, the narrower clamping strips 30 will suffice, since the clamping jaws 6 of the link 42 can extend practically from wall to wall. On the other hand, the placement of the two clamping jaws 6 in hollow profile bar 10 of FIG. 1 reveals owing to the curvature of the circularly cylindrical hollow profile bar 10, the clamping jaws 6 are unable to grip shorter clamping strips securely enough and thus appear to be unstable due to their distance from inner wall 26, so that the broad base is appropriate.

Figure 2:
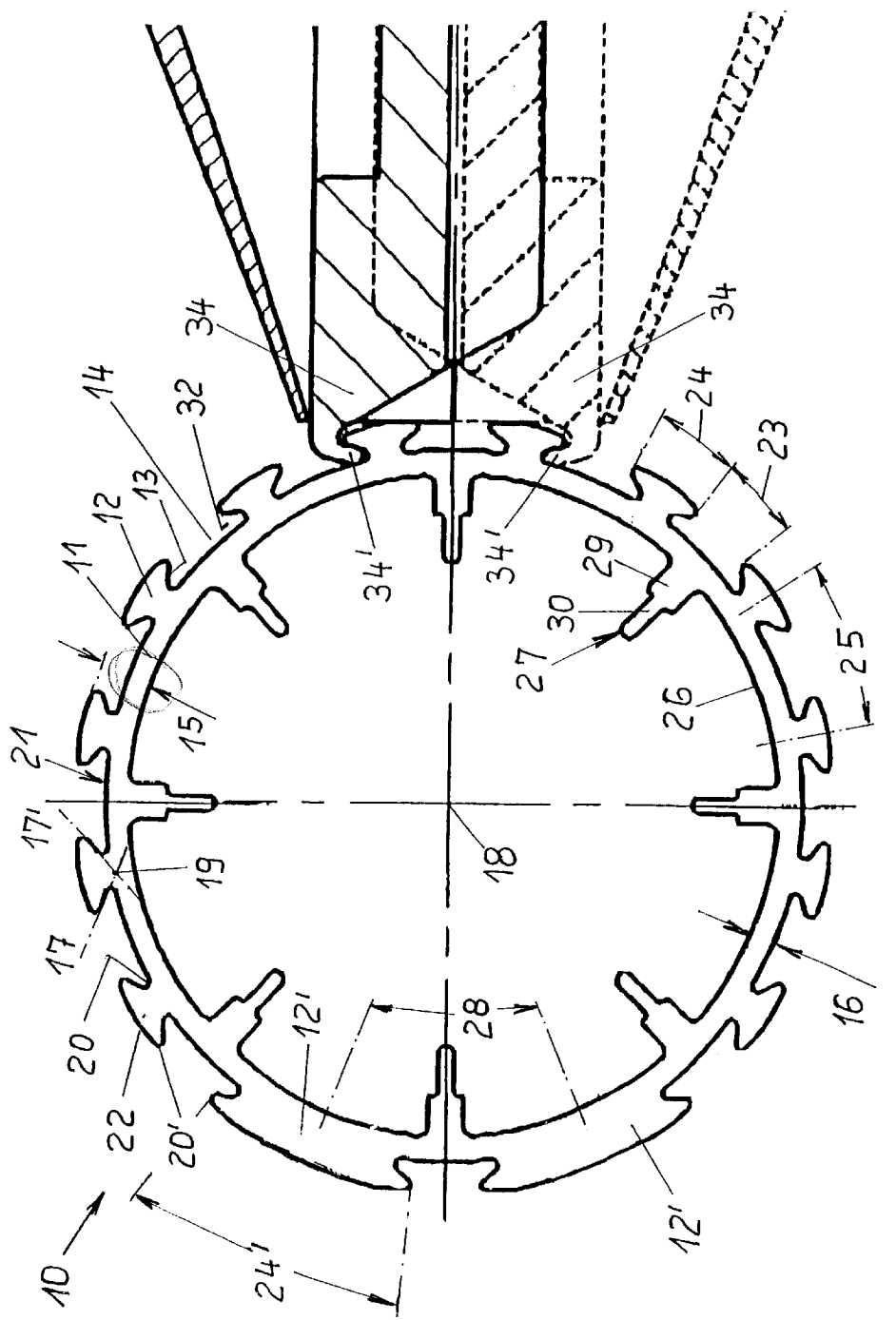
FIG. 2 is an enlarged depiction of the first profile bar of FIG. 1.

The distribution of the inner webs 27 about the circumference depends on the technical object to be achieved. In the arrangements of FIGS. 1 and 2, the inner webs 27 are realized as comparatively long and are therefore merely disposed at a pitch of 45 angular degrees. Thus, comparatively massive and tall links 42 can still be mounted without colliding with the inner webs. The arrangement of the inner webs is such that they are aligned with the casing grooves 14. They therefore stiffen the tubular wall 11 midway between two outer webs 12. This is important when the link 42 laps two inner webs 12 with its tong legs 34. In this case, a tubular wall 11 that was implemented as thin might collapse inward. The broad base 29 reliably prevents this. The pitch 28 of the inner webs 27 in this case is twice that of the outer webs 12, but is as large as, i.e., identical to, that of the outer webs 12'.

Figure 3A:
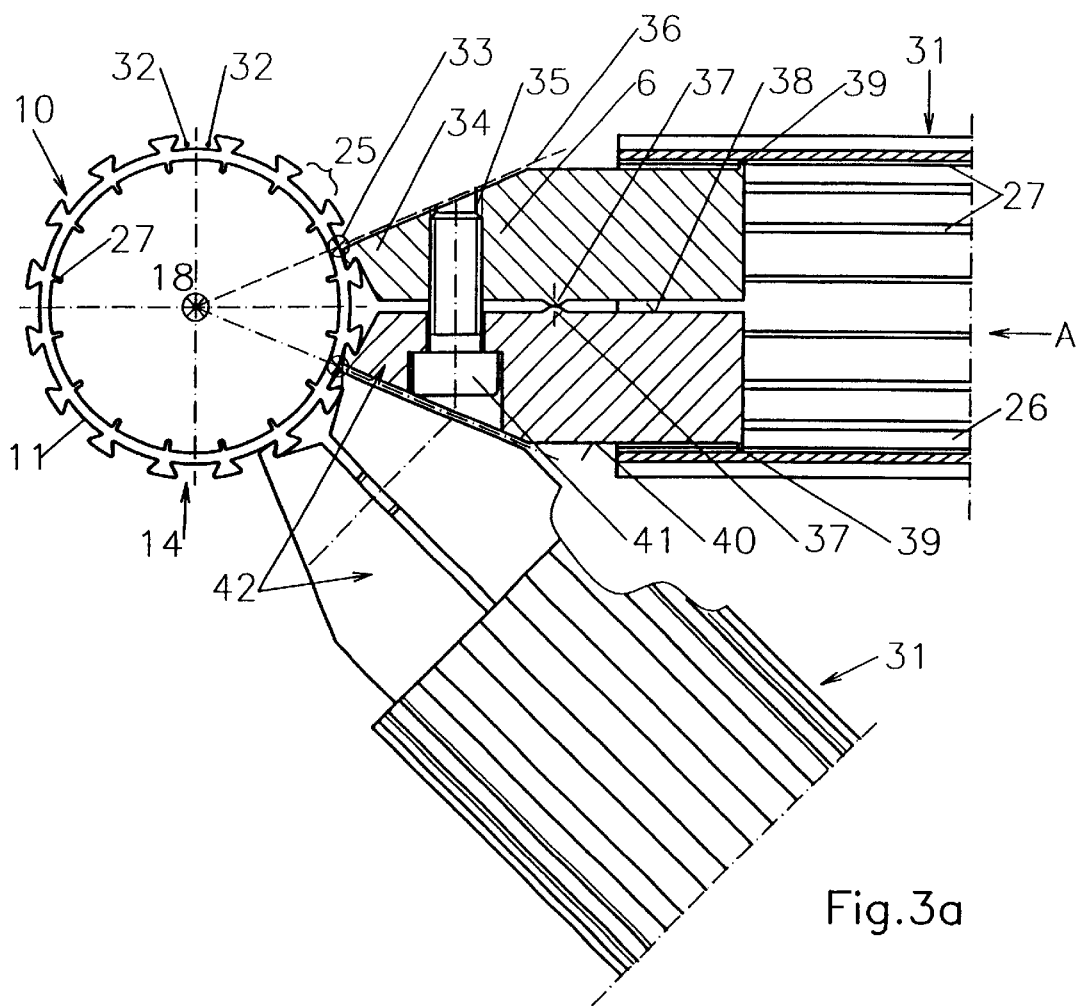

FIG. 3a shows inner webs 27' that can also serve to stiffen the tubular wall 11. However, they are chiefly designed for a link that has a different mode of operation from that of FIGS. 1 and 2.

The links 42 in all the figures have in common the fact that they essentially comprise two clamping jaws 6 that are pressed together by means of a fixing element 41, shown only in FIG. 3a. Link 42 is accordingly clamped onto hollow profile bar 10 by tong legs 34. However, the jaws 6 are also clamped onto the second profile bar 31.

The link 42 of FIGS. 1, 2 consists of two plate-shaped clamping jaws 6 (cf. the schematic placement shown in FIG. 1), which are essentially massively implemented. They clamp clamping strips 30 of inner webs 27 between them at their edges, where they are provided with suitable linear and/or planar clamping faces. The dimensioning of the clamping plates is such that it is impossible for the clamping jaws 6 to bow under load in the region of the fixing element 41. This is counteracted by schematically indicated ribs 6', which are present on each clamping jaw 6 and engage in slots (not shown in further detail) of the respective other clamping jaw 6. Fixation by means of the fixing element 41 therefore ensures the desired linear and/or planar clamping of the clamping strips 30. A positioning projection 43, which is shown here on the lower clamping jaw 6 and which engages in a recess 44 in the upper clamping jaw, serves to position the clamping jaws 6 in the longitudinal direction thereof. A clip 45 serves to hold the two clamping jaws together before they are mounted to profile bar 31, especially during the mounting of link 42 on hollow profile bar 10.

Hollow profile bar 31 is spacedly disposed with respect to hollow profile bar 10, so that a fixing element 41 is freely accessible and can readily be actuated as long as a cover 46 is not yet mounted.

FIG. 3a shows two links 42 applied at the same level of a first profile bar 10. One link 42 has a formed-on element 37 on the inner surface 22 of one clamping jaw 6. Said formed-on element 37 bears against a formed-on element 37 on the other clamping jaw 6. The two clamping jaws 6 can be fastened together. This purpose is served by a fixing element 41, which is realized as a screw and engages in a thread 35. This is provided in the upper clamping jaw 6, while the lower clamping jaw serves to receive a screw head in a countersunk bore. When fixing element 41 is tightened, tong legs 34 of clamping jaws 6 are pressed together and thereby engage in the undercuts 32 of casing grooves 14 of first profile bar 10. Clamping on two outer webs 12 is effected as a result. The formed-on elements 37 divert the force of fixing element 41 and press clamping jaws 6 radially apart at an insertion end of the link 42. This brings about a force fit of the outer circumference 40 of clamping jaws 6 with the inner wall 26 and/or with inner webs 27 of second profile bar 31. The clamping jaws 6 are realized in this case as semicircular at the insertion end, rather than planar as shown in FIG. 1. Outer circumference 33 therefore nearly corresponds to the inner circumference of tubular wall 11 and the spacing between inner webs 27 of the first bar 31. In addition, the clamping jaws are provided with cutting edges 39 that press into the inner webs 27 when fixing element 41 is tightened, thereby preventing link 42 from being withdrawn from bar 31.

In order to mount plural identical links 42 with their attached bars 31 on first hollow profile bar 10, to achieve the tightest possible packing it is necessary that in addition to the cross-sectional configuration of profile bar 10 shown, a tong leg 19 of a clamping jaw 6 must occupy with its leg end 34' no more than half of a casing groove 14. Another tong leg 19 can then be fitted by its end 34' into the other half. This is possible in particular if the link 42 and the end of the second profile bar 31 do not extend beyond the median planes 36 of two casing grooves 14 occupied by clamping jaws. The median planes 36 are defined by axis 18 and by a respective straight line 33 extending parallel to axis 18 and through the center of the casing groove 14. This permits the tight packing of mutually abutting bars 31 whose longitudinal axes form an angle of about 45 degrees, thereby making it possible to assemble correspondingly acute-angled structures and/or for the outer circumference of the bar 10 to be occupied by up to eight elements in one plane of attachment.

Figure 3B:
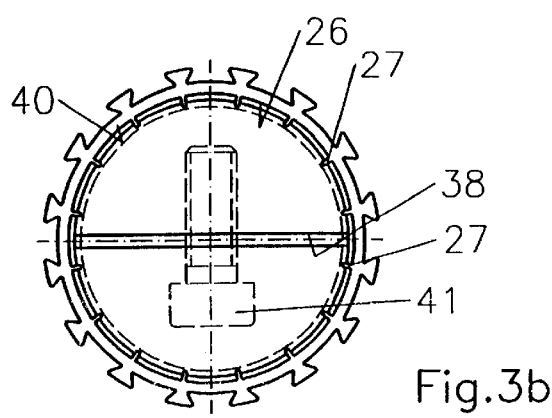

FIG. 3b is a cross section through a link 42 according to FIG. 3a. The outer wall 40 of the clamping jaws 6 is semicircular, i.e., adapted to the shape of the inner wall 26 of second profile bar 31. When fixing element 41 is tightened, the outer walls 40 of clamping jaws 6 are pressed by cutting edges 39 into short inner webs 27. The resulting small contact area makes for a higher contact pressure and thus effective clamping.

What is claimed is:

1. A hollow profile bar (10) of extruded metal comprises a tubular wall (11) that is equally thick all around and is provided with radially salient outer webs (12) evenly distributed about an outer circumference, the webs in pairs forming undercut casing grooves (14) with side walls (13), a salience (15) of the outer webs (12) from said tubular wall (11) being substantially equal to the thickness (16) of said tubular wall (11), wherein slope lines (17, 17') of the side walls (13) of each of the outer webs (12) intersect between the outer web (12) and an axis (18) of the bar, and wherein an inner wall (26) of said tubular wall (11) is provided with more than two radially salient inner webs (27) evenly distributed about an inner circumference.

2. The hollow profile bar (10) as recited in claim 1, wherein said slope lines (17) of the side walls (13) of each of the outer webs (12) have a point of intersection (19) within said tubular wall (11).

3. The hollow profile bar (10) as recited in claim 1, wherein said side walls (13) of the outer webs (12) transition at predetermined radii (20, 20') to a selected one of the outer circumference (21) of said tubular wall (11), and a visible surface (22) of the outer web (12) that is a selected one of parallel to the outer wall and arched convexly with respect thereto.

4. The hollow profile bar (10) as recited in claim 1, wherein a smallest spacing (23) between two of the outer webs (12) is no less than the outer circumferential length (24) of one of the outer webs (12).

5. The hollow profile bar (10) as recited in claim 4, wherein the outer circumferential length (24') of an outer web (12') is about three times the smallest spacing (23) between two outer webs (12).

6. The hollow profile bar (10) as recited in claim 1, wherein a pitch (25) of the outer webs (12) on the tubular wall (11) is a selected one of 22.5 and 45 angular degrees.

7. The hollow profile bar (10) as recited in claim 1, wherein the inner webs (27) are aligned with the undercut casing grooves (14).

8. The hollow profile bar (10) as recited in claim 7, wherein a pitch (28) of the inner webs (27) is a selected one of the same as, and twice that of the casing grooves (14).

9. The hollow profile bar (10) as recited in claim 1, wherein each of the inner webs (27) comprises a broad base (29) and a thinner clamping strip (30) extending radially therefrom.

* * * * *